(12) United States Patent
Jenko

(10) Patent No.: US 7,467,941 B2
(45) Date of Patent: Dec. 23, 2008

(54) DUAL PISTON VALVE STEM ACTUATOR

(75) Inventor: Edward Joseph Jenko, Essex, VT (US)

(73) Assignee: Husky Injection Molding Systems, Bolton, Ontario (CA)

( * ) Notice: Subject to any disclaimer, the term of this patent is extended or adjusted under 35 U.S.C. 154(b) by 130 days.

(21) Appl. No.: 11/737,895

(22) Filed: Apr. 20, 2007

(65) Prior Publication Data

US 2008/0258342 A1    Oct. 23, 2008

(51) Int. Cl.
*B29C 45/23* (2006.01)
(52) U.S. Cl. ........................ 425/564; 425/572
(58) Field of Classification Search ................ 425/562, 425/563, 564, 565, 566, 572
See application file for complete search history.

(56) References Cited

U.S. PATENT DOCUMENTS

| | | | | |
|---|---|---|---|---|
| 4,026,518 A | * | 5/1977 | Gellert | ........................ 425/566 |
| 4,344,750 A | | 8/1982 | Gellert | |
| 5,518,393 A | | 5/1996 | Gessner | |
| 5,885,628 A | | 3/1999 | Swenson et al. | |
| 6,159,000 A | | 12/2000 | Puri et al. | |
| 6,238,203 B1 | * | 5/2001 | Koh | ........................... 425/562 |
| 6,555,044 B2 | | 4/2003 | Jenko | |
| 6,729,871 B2 | | 5/2004 | Sattler et al. | |
| 6,840,758 B2 | | 1/2005 | Babin et al. | |
| 7,125,246 B2 | * | 10/2006 | Schmidt | ...................... 425/563 |
| 7,410,354 B2 | * | 8/2008 | Olaru | ......................... 425/564 |

* cited by examiner

*Primary Examiner*—Tim Heitbrink

(57) ABSTRACT

An injection molding apparatus includes a valve support structure having an internal channel for directing a flow of melted resin to a mold cavity. A first valve actuator is supported by the valve support structure and is operatively connected to a valve stem. The valve stem extends at least partially through the internal channel through a valve aperture. A bushing is fitted in the valve aperture. A second valve actuator is located adjacent the first valve actuator. The second valve actuator is operatively connected to a sleeve member with a hollow interior dimensioned to slidingly engage the valve stem and an exterior surface dimensioned for sliding movement in the bushing. The second valve actuator selectively moves the sleeve member between a retracted position where the sleeve member moves toward the bushing and an extended position where the sleeve moves away from of the bushing.

27 Claims, 3 Drawing Sheets

DUAL PISTON VALVE STEM ACTUATOR

BACKGROUND OF INVENTION

In injection molding, a significant problem is leakage. Leakage is becoming an increasing challenge as new low viscosity resins continue to emerge. Resins that have a melt flow index ("MFI") of greater than 80 can excessively leak even with a small gap. However, a tight fit between the stem and the bushing can cause the stem to seize. Also, the manufacturing tolerances that are required to prevent leaks are very exacting and costly.

An approach that has been utilized to address this situation is the use of coatings and/or treatments of not only the valve stem but the valve bushing to prevent resin leakage. This provides for a very expensive approach for dealing with this problem.

Another approach to this situation is disclosed in U.S. Pat. No. 6,840,758 (Babin et al.). This patent discloses a spacer that is compressed between an actuator block and a manifold block. The compression causes the spacer to compress and cause the bushing to prevent seepage from traveling up the valve stem and the bushing. However, if too much pressure is applied to the spacer, then valve stem seizure will occur. Also, too little compression may provide leakage.

Still another approach is disclosed in U.S. Pat. No. 6,159,000 (Puri et al.), which discloses a guide sleeve that has a narrow portion that clings to the outside of the valve stem. However, this guide sleeve does not assert any additional pressure to block the flow of resin, especially low viscous resin having a high MFI.

U.S. Pat. No. 6,729,871 (Sattler et al.) discloses the utilization of a cooled bush that increases the viscosity of the melted thermoplastic material in the gap between the stem and the bush. In this manner, leakage is prevented even when the gap is large; however, additional energy and resources are required to provide the cooling, and in this manner there are also issues created involving maintenance. A similar approach is to require cooling to a back plate to increase resin viscosity and prevent resulting leakage. This again is a very costly approach with regard to not only initial expenditures but also energy costs as well as ongoing maintenance.

U.S. Pat. No. 5,518,393 (Gessner) discloses a bushing having a melt channel for mating with a melt channel in a manifold in which the bushing is housed and with an axial channel in a nozzle body. The bushing is sized to fit within a bore in the manifold in an attempt to reduce the possibility of leakage between the bushing and the manifold. However, there is nothing in this structure that will provide additional constriction on the valve stem to reduce resin leakage in the presence of heat, pressure and a high MFI resin.

U.S. Pat. No. 4,344,750 (Gellert) discloses an electrically heated sprue bushing that is seated in a well in the cavity plate with a centrally extending melt runner passage which branches radially outward with separate channels leading to a number of edge gates in the cavity plate. An air gap is provided to insulate the hot sprue bushing from the surrounding cooled cavity plate and a hollow seal is provided at each gate to convey the melt across the air gap. This heating of the metal applies the pressure to prevent resin flow. This is a feature that requires significant energy consumption as well as more maintenance due to increased complexity.

U.S. Pat. No. 5,885,628 (Swenson et al.) discloses an injection molding nozzle for disposition in a mold. The nozzle is for injecting melt into a cavity of the mold, and includes a body having a through bore extending therethrough for receiving the melt. A nozzle member surrounds the body at a position upstream of the nozzle piece and has an inner surface contacting the body and an outer surface contacting the mold that forms a seal against melt flow upstream from the nozzle member. Swenson et al. does not apply any additional pressure to the valve stem to prevent resin flow when resin is flowing in the nozzle.

U.S. Pat. No. 6,555,044 (Jenko) discloses a bushing held in the manifold by a nut that traps a back-up pad. When this nut is tightened, a metal "O" ring seals tightly to prevent plastic leakage along the bore of the bushing. However, "O" rings eventually wear out so that with the presence of vibration, the nut can loosen up to allow resin to flow.

The present invention is directed to overcoming one or more of the problems set forth above.

SUMMARY OF INVENTION

In an aspect of this invention, an injection molding apparatus is disclosed. The injection molding apparatus includes a valve support structure having an internal channel for directing a flow of melted resin past the valve support structure to a mold cavity, a first valve actuator operatively connected to the valve support structure and to a valve stem, the valve stem extending at least partially through a valve aperture in the valve support structure to control the flow of resin through the channel, a bushing fitted in the valve aperture, and a second valve actuator located adjacent the first valve actuator, the second valve actuator operatively connected to a sleeve member, the sleeve member having a hollow interior dimensioned to slidingly engage the valve stem and an exterior surface dimensioned for sliding movement in the bushing, the second valve actuator selectively moving the sleeve member between a retracted position where the sleeve member moves toward the bushing and an extended position where the sleeve moves away from the bushing.

In another aspect of the invention, an injection molding apparatus includes a manifold having an internal channel for directing a flow of melted resin to a mold cavity. A first valve actuator is operatively connected to a valve stem. The valve stem extends at least partially through an aperture in the manifold into the internal channel. A bushing is mounted in the aperture. A second valve actuator is located adjacent the first valve actuator and operatively connected to a sleeve member. The second valve actuator selectively moves the sleeve member between first and second positions, where in the first position the sleeve member seals against the bushing and at least partially reduces melted resin leakage outside of the internal channel adjacent the aperture and where in the second position the sleeve member unseals from the bushing.

In still another aspect of the invention, an injection molding apparatus includes a manifold, a nozzle housing, at least one first valve mechanism, having a valve actuator, for controlling resin flow through at least one of the manifold or the nozzle housing, and at least one second valve mechanism for selectively closing and sealing a gap located between the at least one first valve mechanism and the controlled resin flow.

In another aspect of the invention, an injection molding apparatus includes a manifold having a bore supporting a nozzle assembly therein. The nozzle assembly including first and second valve actuators and has an internal channel for directing a flow of melted resin to a mold cavity. The first valve actuator is operatively connected to a valve stem. The valve stem extends at least partially through an aperture in the nozzle assembly into the internal channel. The aperture has a bushing mounted therein. The second valve actuator is located adjacent the first valve actuator and operatively connected to a sleeve member. The second valve actuator selectively moves the sleeve member between first and second positions, where in the first position the sleeve member seals against the bushing and at least partially reduces melted resin leakage outside of the internal channel adjacent the aperture and where in the second position the sleeve member unseals from the bushing.

In still yet another aspect of the invention, a method for utilizing an injection molding apparatus is disclosed. The method includes directing a flow of melted resin past a valve support structure, having an internal channel, to a mold cavity, controlling the flow of resin through the internal channel with a valve stem extending at least partially through the internal channel through a valve aperture in the valve support structure with a first valve actuator operatively connected to the valve support structure and to the valve stem, and selectively moving a sleeve member between a retracted position where the sleeve member moves toward a bushing and an extended position where the sleeve moves away from the bushing with the sleeve member utilizing a second valve actuator located adjacent the first valve actuator and at least partially supported by the valve support structure, the second valve actuator operatively connected to the sleeve member, the sleeve member having a hollow interior dimensioned to slidingly engage the valve stem and an exterior surface dimensioned for sliding movement in the bushing fitted in the valve aperture.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION OF THE INVENTION

Figure 1:
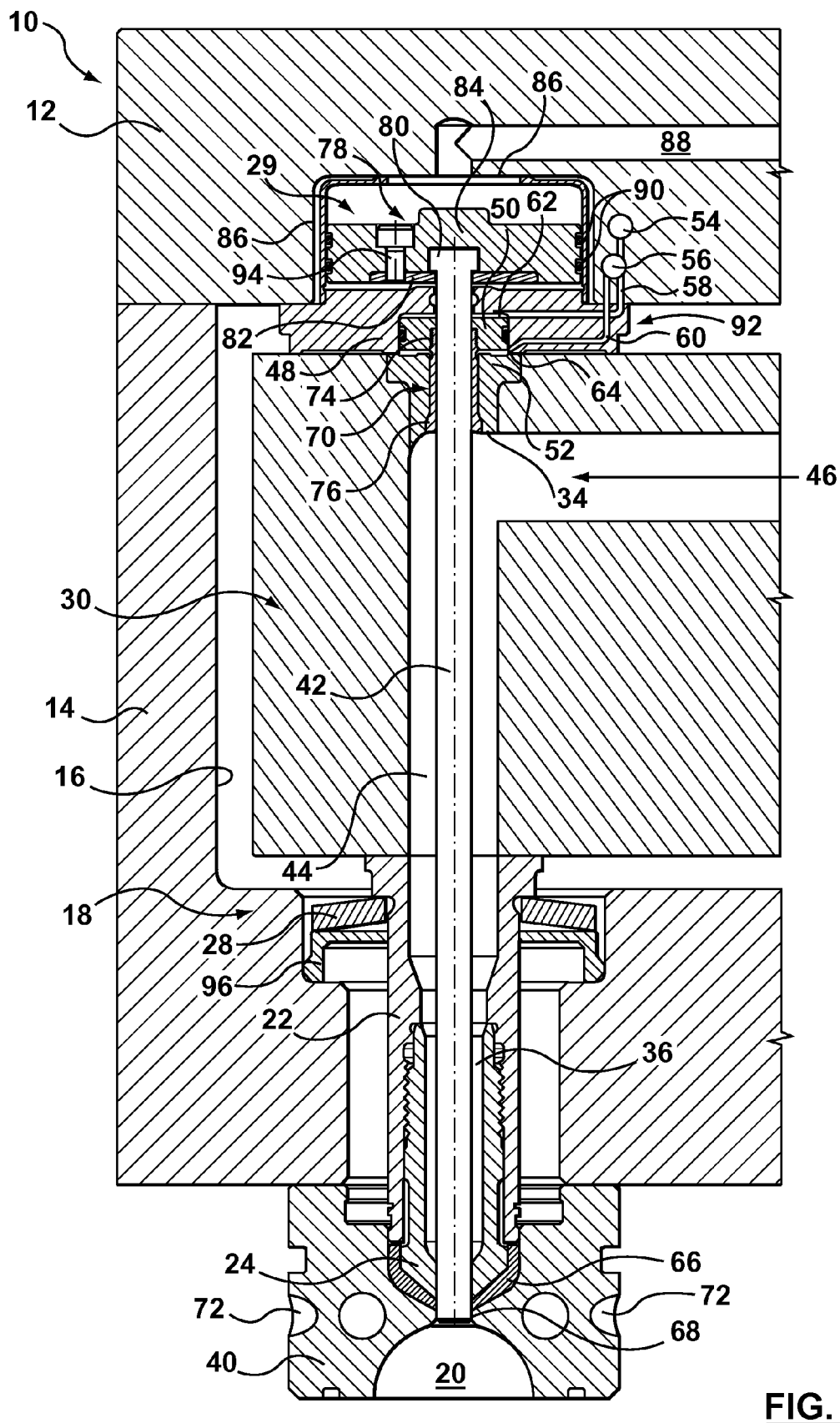
FIG. 1 is a sectional view through an injection molding apparatus of the present invention having a dual piston valve stem actuator in accordance with a preferred embodiment of the present invention.

Referring initially to FIG. 1, a hot runner valve gate system for injecting resin into a mold, or the like, is illustrated and is generally indicated by numeral 10. The system includes a backing plate 12 and a manifold plate 14. The manifold plate includes a bore 16 dimensioned to receive a nozzle assembly 18. The nozzle assembly 18 introduces melted resin into a mold cavity 20, and includes a nozzle housing 22 with a nozzle tip 24 secured thereto. There is a heater (not shown) that is at least partially positioned on an outside diameter of the nozzle housing 22. The heater may be any suitable heater known in the art to which current is provided by way of an electric cable. There are a wide variety of heat conductive materials that can be utilized for the nozzle housing 22, and an illustrative, but nonlimiting, example includes steel. Also, there is a wide variety of heat conductive materials that can be utilized for the nozzle tip 24, and an illustrative, but nonlimiting, example includes copper alloys.

The nozzle housing 22 includes an axial channel 36 through which molten resin can flow to the mold cavity 20. The nozzle tip 24 surrounds a terminal portion of the axial channel 36. There is an insulator 66 that occupies the space between the nozzle tip 24 and the gate insert 40 and also contains a melt channel opening 68 located therein. There are cooling channels 72 in the gate insert 40 that allow the melted resin to solidify in the mold cavity 20 prior to the opening of a mold (not shown).

A manifold 30 is formed between the manifold plate 14 and the backing plate 12 and is separated from the manifold plate 14 and the backing plate 12 by an air gap 92. The manifold 30 includes the melt channel 46 that forms a portion of the hot runner system that transports molten resin from a source (not shown) to the gate insert 40 associated with a mold cavity 20.

There is a disk spring 28 that will deflect as the manifold 30 and the nozzle housing 22 expand due to an increase in temperature. This disk spring 28 will create a resilient spring action in the nozzle assembly 18. The disk spring 28 is mounted on a nozzle insulator 96, where the nozzle insulator 96 is adjacent to and supports the position of the nozzle housing 22.

There is a valve stem 42 that controls the opening and closing of the melt channel opening 68 located in the gate insert 40 that controls the flow of molten resin into the mold cavity 20. The valve stem 42 can be made of a wide variety of shapes and materials. An illustrative, but non-limiting, embodiment of a valve stem 42 includes a steel rod. The valve stem 42 extends through an aperture 34 into a passageway 44 in the manifold 30 and into the nozzle housing 22. The passageway 44 connects to a melt channel 46 located in the manifold 30.

Figure 2:
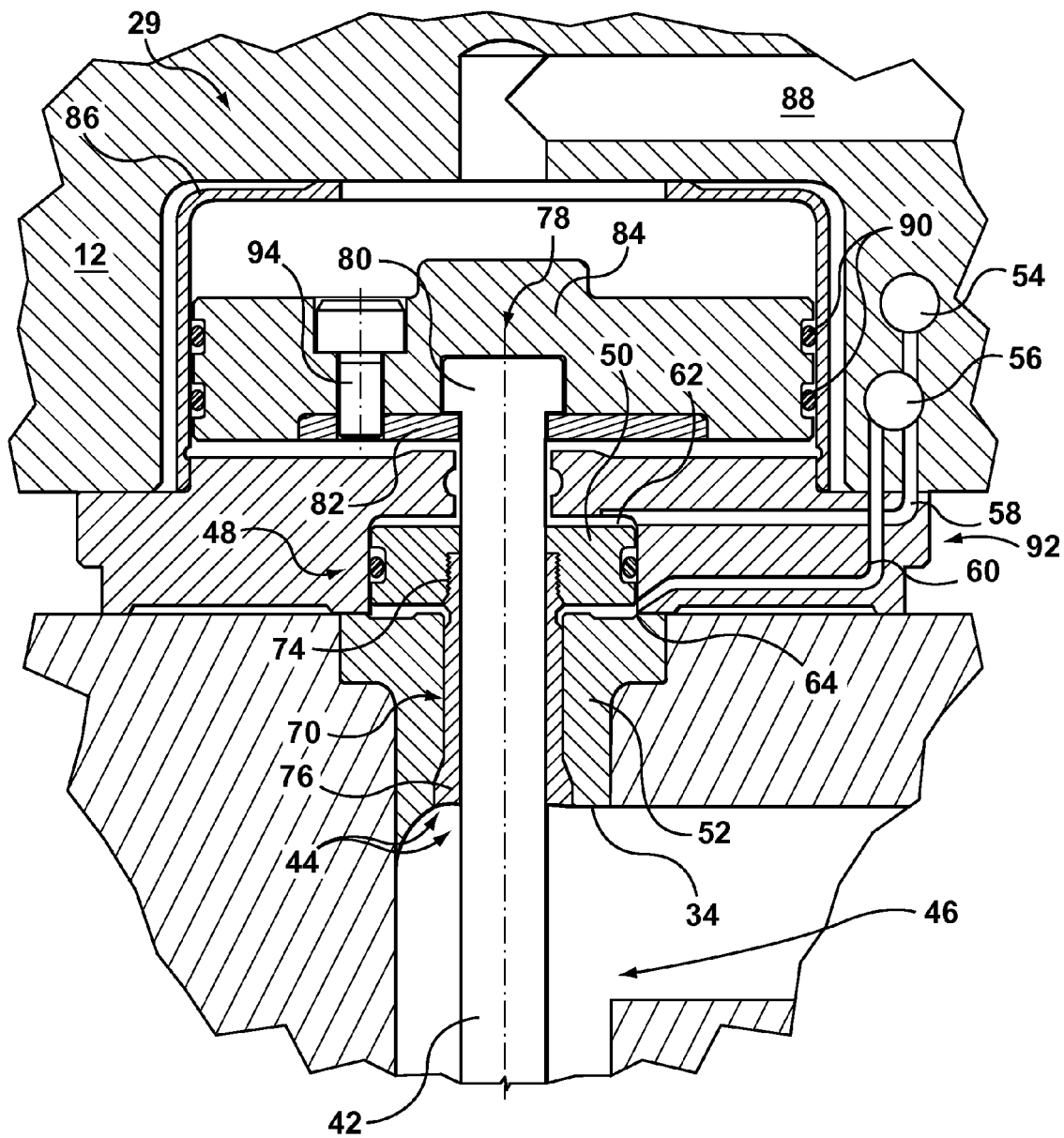
FIG. 2 is an isolated view of a dual piston valve stem actuator, as shown in FIG. 1, in accordance with the preferred embodiment of the present invention.

Referring now to FIG. 2, the other end of the valve stem 42 operatively connected a dual piston valve stem actuator that is generally indicated by numeral 29. The dual piston valve stem actuator 29 is supported at least in part by the manifold 30 and includes a first piston mechanism, which is generally indicated by numeral 78 and directly connected to a top portion 80 of the valve stem 42. The top portion 80 of the valve stem 42 preferably, but not necessarily, includes a flange. There is a plate 82 that connects to a piston head 84 through an attachment mechanism, e.g., screw, 94. Other illustrative, but non-limiting examples of attachment mechanisms, include a rivet, a screw, adhesives, welding, and/or brazing. The piston head 84 is housed within a cylinder 86 and the backing plate 12. Fluid, e.g., pneumatic air, can be selectively provided through a first channel 88 into an upper chamber 73 to provide downward pressure on the first piston mechanism 78. Also, fluid, e.g., pneumatic air, is selectively provided through a second channel 75 into a lower chamber 71 to apply upward pressure on the first piston mechanism 78. The piston head 84 preferably includes at least one seal 90, e.g., two o-ring seals, positioned adjacent to the inside walls of the cylinder 86. The cylinder 86 preferably, but not necessarily, includes a cup-shaped configuration.

There is a second piston mechanism 48 that is located below the first piston mechanism 78 and includes a second piston 50, a bushing 52 and a sealing sleeve member 70. The bushing 52 is affixed to the manifold 30 adjacent the aperture 34. The second piston moves with vertical reciprocating motion within the chamber 62. There is a first inlet port 54 that can provide a fluid, e.g., air, in a first conduit 58 to a first chamber 62 to apply downward pressure to the second piston 50 to move the second piston 50 away from the first piston mechanism 78, and an second inlet port 56 that can provide a fluid, e.g., air, in a second conduit 60 to a second chamber 64 to apply upward pressure to the bottom of the second piston 50 to move the second piston 50 towards the first piston mechanism 78. The sleeve member 70 is disposed within the bushing 52 for vertical reciprocating motion therein, and includes a top portion 74 that is attached to the second piston 50, preferably, but not necessarily, via a threaded attachment. The bottom portion 76 of the sleeve member 70 preferably includes a larger outside diameter to provide a wedge and create a relatively tight seal to prevent melted resin from flowing outside of the passageway 44 in the area adjacent the aperture 34. The sleeve member 70 has a hollow interior that receives the first valve stem 42 with a tight sliding fit.

The first step in the operation of the dual piston valve stem actuator 29 involves moving both the second piston 50 and the first piston mechanism 78 downward, as shown on FIGS. 1 and 2. This is followed by moving the first piston mechanism 78 upward and along with the connected valve stem 42. The second piston 50 then moves the sleeve member 70 upward to close all clearances between the sliding surfaces. The melted resin is then injected into the melt channel 46 and the sealing force providing by the bottom portion 76 of the sleeve member 70 operates as a wedge to create a tight seal and prevent melted resin from flowing outside of the passageway 44 in the area adjacent the aperture 34. At this point as shown in FIG. 1, the second piston 50 moves in a downstroke to release the sealing force and the first piston mechanism 78 moves in a downstroke so that the valve stem 42 closes and/or reduces the cross-sectional area of the gate insert 40 to restrict or stop the flow of molten resin into the mold cavity 20. Conversely, moving the valve stem 42 upward with the first piston mechanism 78 opens and/or increases the cross-sectional area of the gate insert 40 to allow the flow of molten resin into the mold cavity 20.

Referring again to both FIG. 1 and FIG. 2, the wedge operation of the sleeve member 70 is very helpful in reducing melted resin leakage. Moreover, this equipment can be manufactured with larger or looser manufacturing tolerances. This can significantly reduce the cost of the injection molding equipment. Maintenance is also significantly improved since tight tolerances that prevent melted resin flow are difficult to maintain over time under high heat in a manufacturing environment. Moreover, this technology enables the utilization of low viscosity resins that have a high MFI.

Alternatively, the second piston 50 may be pressurized to maintain a constant seal force on passageway 44. In this embodiment, sufficient force on the second piston 50 will be applied to seal plastic leakage outside channel 46 but still be light enough to permit sliding movement of the valve stem 42 to open and close the melt channel opening 68.

Figure 3:
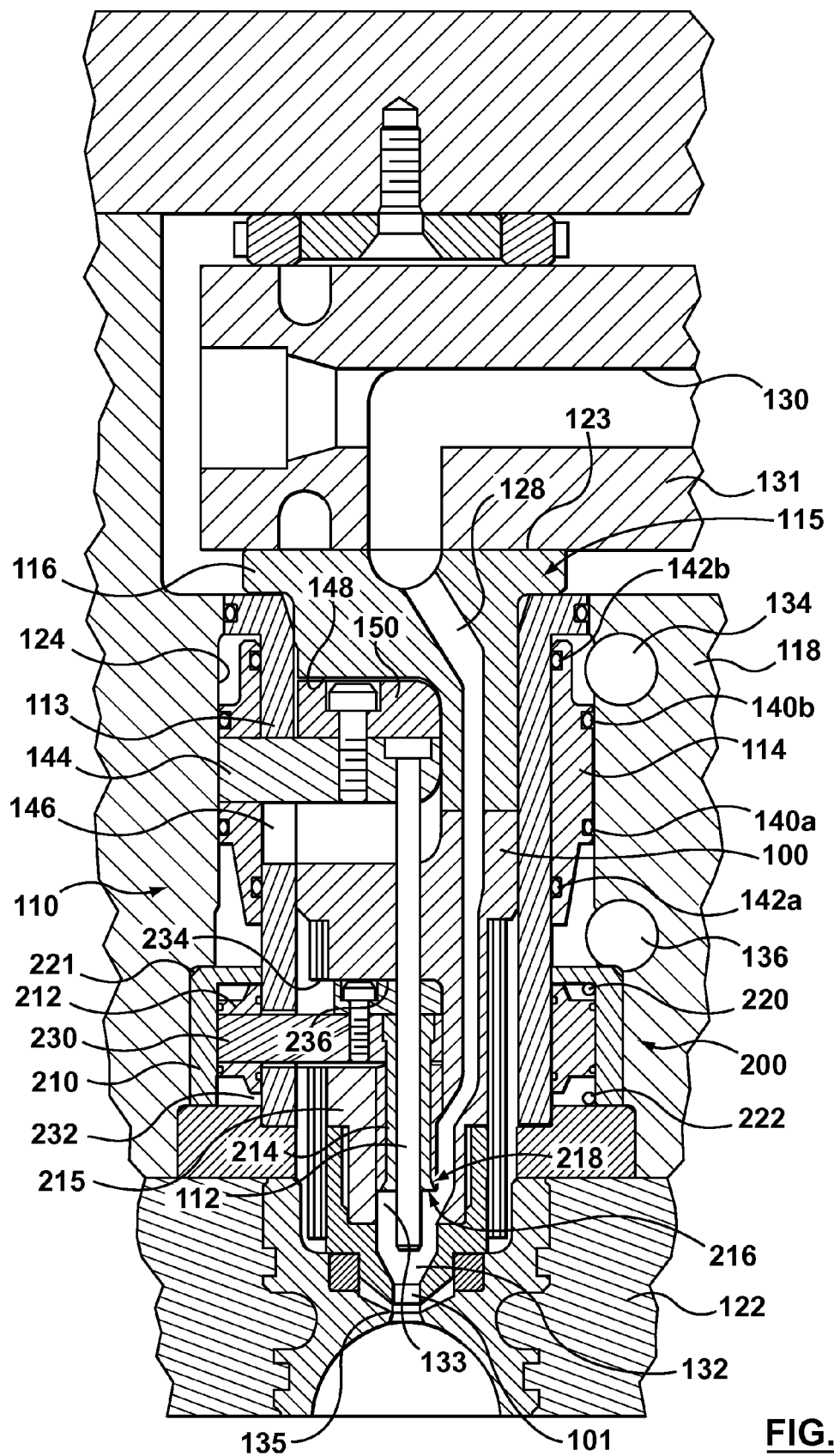
FIG. 3 is an alternate embodiment of a dual piston valve stem actuator where the main melt channel is offset from the dual piston actuator assembly.

FIG. 3 shows an alternate embodiment of the invention where the first and second piston mechanisms are arranged outside of the main manifold melt channel. Referring now to FIG. 3 in detail, the first piston mechanism 110, a valve stem 112, a nozzle support sleeve 113, a cylindrical piston 114 and a nozzle housing 115 is shown, which includes an upper nozzle housing 116 and a lower nozzle housing 100. A mold manifold plate 118 is formed with a bore 124 for receiving the nozzle support sleeve 113 and upper nozzle housing 116. The inner surface of cylindrical piston 114 slidably engages the outer surface of cylindrical nozzle support sleeve 113, and the upper nozzle housing 116 is positioned coaxially within the nozzle support sleeve 113. The nozzle support sleeve 113 is coaxially positioned relative to upper nozzle housing 116 and functions to guide the first piston 114 adjacent the upper nozzle housing 116 and also functions to align the nozzle housing 115 centrally within the bore 124 through the mold manifold plate 118.

The upper nozzle housing 116 is essentially an elongated rod shaped member having a base portion 123 adapted to be fastened to a lower nozzle housing 100 inside the mold manifold plate 118 and support the first and second valve as will be described below. The upper nozzle housing 116 includes at least one channel 128 extending therethrough and is in communication with the melt flow channel 130 located in the hot runner manifold 131. The channel 128 extends substantially the length of the nozzle housing 115 and converges with an injection channel 132, which runs longitudinally in the lower nozzle housing 100. The channel 128 and the injection channel 132 converge toward the end of lower nozzle housing 100 adjacent a mold plate 122. The valve stem 112 extends through an aperture 133 in the distal end of the lower nozzle housing 100 through a tip 101. With the first valve stem 112 in the closed position, the end of the first valve stem 112 blocks the flow of molding material through the channel 128 and into the injection channel 132. However, with valve stem 112 in the retracted position as shown in FIG. 3, molding material is allowed to flow through channel 128 into the injection channel 132 which also leads into the mold cavity 122. Upon closing the first valve stem, the first valve stem 112 extends to a position relatively close to an injection gate orifice 135, thereby assuring a true center location of the valve stem in the gate and avoiding undue wear caused by valve stem bending or flexing during the closing of the valve stem.

Actuation of the first valve stem 112 in a reciprocating manner for opening and closing the flow path of the molding material from channel 128 into the injection channel 132 is accomplished via the sliding movement of the first piston 114 against the nozzle support sleeve 113. The first piston 114 is set into motion by the use of pressurized air directed into ports 134 and 136 which extend through mold manifold plate 118 in fluid communication with the outer surface of cylindrical piston 114. The first piston 114 also includes a series of seals 140a and 140b, and 142a and 142b, wherein the seals 140a and 140b are positioned between the outer surface of first piston 114 and the bore 124 and the seals 142a and 142b are positioned between the inner surface of the first piston 114 and the nozzle support sleeve 113.

The first piston mechanism valve stem 112 is reciprocated through the upper nozzle housing 116 via a first cross bar 144 extending between the first piston 114 and the first valve stem 112. The first cross bar 144 projects through a first opening 146 in the nozzle support sleeve 113 and into a first cavity 148 in the upper nozzle housing 116. Upon the movement of the first piston 114, the first cross bar 144 is also moved through the first opening 146 and the first cavity 148, thereby effecting vertical motion of the first valve stem 112. Within the cavity 148, a first cap 150 is attached to the first cross bar 144 and is adapted to engage a wall defining the first cavity 148 to provide a mechanical stop upon the complete stroke of the first piston 114.

As with the embodiment of the invention shown in FIGS. 1 and 2, a second piston mechanism 200 is provided in the bore 124. The second piston mechanism 200 comprises a second cylinder 210 in which a second piston 212 is disposed for vertical reciprocating motion therein. A sealing sleeve member 214 is operatively connected to the second piston 212 and disposed within a bushing 215 affixed to the end of the lower nozzle housing 100 adjacent the aperture 133 for vertical reciprocating motion therein. The sealing sleeve member 214 has a hollow interior that receives the first valve stem 112 with a tight sliding fit. A bottom portion of the sealing sleeve member 214 has an outwardly flared distal end 216 that cooperates with a taper 218 formed in the bushing 215 at the convergence point of the end of the bushing 215, the end of the lower nozzle housing 100 and the injection channel 132. The flared bottom portion 216 of the sealing sleeve member 214 cooperates with the taper 218 in the bushing 215 to provide a wedge and create a relatively tight seal to prevent melted resin leakage from the injection channel 132 in the area adjacent the aperture 133.

There is a first inlet port 220 that can provide a fluid, e.g., air, to apply downward pressure to the top of the second piston 212 to move the second piston mechanism 200 away from the first piston mechanism 110, and also a second inlet port 222 that can provide a fluid, e.g., air, to apply upward pressure to the bottom of the second piston 212 to move the second piston mechanism 200 towards the first piston mechanism 110.

A second cross bar 230 is connected to the second piston 212 and extends through a second opening 232 in the nozzle support sleeve 113 into a second cavity 234 in the lower nozzle housing 100. A top portion of the second valve member 214 is attached to the second cross bar 230, preferably, but not necessarily, via a threaded attachment. Upon the movement of the second piston 212 within a frame 221, the second cross bar 230 is also moved vertically through the second opening 232 and the second cavity 234, thereby effecting vertical motion of the second valve member 214. Within the second cavity 234, a second cap 236 is attached to the second cross bar 230 and is adapted to engage a wall defining the second cavity 234 to provide a mechanical stop upon the complete stroke of the second piston 212.

The first step in the operation of the mechanism of FIG. 3 involves moving both the second piston mechanism 200 and the first piston mechanism 110 downward. This is followed by moving the first piston 114 upward along with the first valve stem 112. The second piston mechanism 200 then moves the sealing sleeve member 214 upward to close all clearances between the sliding surfaces. The melted resin is then injected into the melt channel 128 where it flows to the injection channel 132, and the sealing force providing by the flared bottom portion 216 of the sealing sleeve member 214 and the taper 218 of the bushing 215 operates as a wedge to create a tight seal and prevent melted resin leakage from outside the injection channel 132. At this point, the second piston mechanism 200 moves in a downstroke to release the sealing force, and the first piston mechanism 100 moves in a downstroke so that the first valve stem 112 closes and/or seals against the gate orifice 135 to restrict or stop the flow of molten resin into the mold cavity. Conversely, moving the first valve stem 112 upward with the first piston mechanism 100 unseals the gate orifice 135 to allow the flow of molten resin into the mold cavity.

Alternatively, the second piston mechanism 200 may be pressurized to maintain a constant seal force between a hollow interior of the sealing sleeve member 214 for the second valve member 214 and the first valve stem 112. In this embodiment, sufficient force on the second piston mechanism 200 will be applied to seal plastic leakage around the first valve stem 112, but still be light enough to permit sliding movement of the first valve stem 112 to open and close the injection gate orifice 135.

Other aspects, objects and advantages of the present invention can be obtained from a study of the drawings, the disclosure and the appended claims. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have,""having," "includes" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention, which is limited only by the claims that follow.

What is claimed is:

1. An injection molding apparatus comprising:
   a valve support structure having an internal channel for directing a flow of melted resin past the valve support structure to a mold cavity;
   a first valve actuator operatively connected to the valve support structure and to a valve stem, the valve stem extending at least partially through a valve aperture in the valve support structure to control the flow of resin through the channel;
   a bushing fitted in the valve aperture; and
   a second valve actuator located adjacent the first valve actuator, the second valve actuator operatively connected to a sleeve member, the sleeve member having a hollow interior dimensioned to slidingly engage the valve stem and an exterior surface dimensioned for sliding movement in the bushing, the second valve actuator selectively moving the sleeve member between a retracted position where the sleeve member moves toward the bushing and an extended position where the sleeve moves away from the bushing.

2. The injection molding apparatus according to claim 1, wherein with the sleeve in the retracted position, the sleeve member seals against the bushing and reduces melted resin leakage outside of the internal channel in an area adjacent the aperture.

3. The injection molding apparatus according to claim 1, wherein with the sleeve in the extended position, the sleeve member allows positioning of the valve stem to restrict flow of melted resin in the internal channel.

4. The injection molding apparatus according to claim 1, wherein the valve support structure comprises a manifold.

5. The injection molding apparatus according to claim 4, wherein the aperture is arranged in the manifold.

6. The injection molding apparatus according to claim 1, wherein the sleeve member has a first end operatively connected to the second valve actuator and an axially opposite end with a sealing surface that cooperates with a matching sealing surface of the bushing to reduce melted resin leakage outside of the internal channel adjacent the aperture.

7. The injection molding apparatus according to claim 1, further comprising a piston mechanism operatively connected to the second valve actuator for moving the sleeve member between the retracted and extended positions.

8. The injection molding apparatus according to claim 7, wherein pressurized air is introduced to the piston mechanism for actuating the second valve actuator.

9. The injection molding apparatus according to claim 1, wherein the valve support structure comprises a nozzle housing.

10. The injection molding apparatus according to claim 8, wherein the first and second valve actuators are disposed at least partially within the nozzle housing.

11. The injection molding apparatus according to claim 8, wherein the first valve stem and the sleeve member extend through the nozzle housing.

12. The injection molding apparatus according to claim 1, wherein the sleeve member in the retracted position allows positioning of the valve stem to restrict flow of melted resin in the internal channel.

13. An injection molding apparatus comprising:
   a manifold having an internal channel for directing a flow of melted resin to a mold cavity;
   a first valve actuator operatively connected to a valve stem, the valve stem extending at least partially through an aperture in the manifold into the internal channel;
   a bushing mounted in the aperture;
   a second valve actuator located adjacent the first valve actuator and operatively connected to a sleeve member, the second valve actuator selectively moving the sleeve member between first and second positions, where in the first position the sleeve member seals against the bushing and at least partially reduces melted resin leakage outside of the internal channel adjacent the aperture and where in the second position the sleeve member unseals from the bushing.

14. The injection molding apparatus of claim 13, wherein with the sleeve member in the second position, the sleeve member allows positioning of the valve stem to restrict flow of melted resin in the internal channel.

15. The injection molding apparatus of claim 13, wherein with the sleeve member in the first position, the sleeve member allows positioning of the valve stem to restrict flow of melted resin in the internal channel.

16. The injection molding apparatus of claim 13, wherein the bushing and sleeve member have sealing surfaces that engage as the sleeve is moved to the first position.

17. The injection molding apparatus of claim 13, wherein the first and second valve actuators comprise pistons.

18. An injection molding apparatus comprising:
   a manifold having a bore supporting a nozzle assembly therein, the nozzle assembly including first and second valve actuators and having an internal channel for directing a flow of melted resin to a mold cavity, the first valve actuator being operatively connected to a valve stem, the valve stem extending at least partially through an aperture in the nozzle assembly into the internal channel, the aperture having a bushing mounted therein, the second valve actuator being located adjacent the first valve actuator and operatively connected to a sleeve member, the second valve actuator selectively moving the sleeve member between first and second positions, where in the first position the sleeve member seals against the bushing and at least partially reduces melted resin leakage outside of the internal channel adjacent the aperture and where in the second position the sleeve member unseals from the bushing.

19. The injection molding apparatus of claim 18, wherein with the sleeve member in the second position, the sleeve member allows positioning of the valve stem to restrict flow of melted resin in the internal channel.

20. The injection molding apparatus of claim 18, wherein with the sleeve member in the first position, the sleeve member allows positioning of the valve stem to restrict flow of melted resin in the internal channel.

21. The injection molding apparatus of claim 18, wherein the bushing and sleeve member have sealing surfaces that engage as the sleeve is moved to the first position.

22. The injection molding apparatus of claim 18, wherein the first actuator comprises a piston.

23. The injection molding apparatus of claim 22, wherein the piston reciprocates in the bore.

24. The injection molding apparatus of claim 23, wherein the valve stem is connected to the piston via a connection linkage that extends through an opening in the nozzle assembly that communicates with the bore.

25. The injection molding apparatus of claim 18, wherein the second actuator comprises a piston.

26. The injection molding apparatus of claim 25, wherein the piston reciprocates in a cylinder mounted in the bore.

27. The injection molding apparatus of claim 26, wherein the sleeve member is connected to the piston via a connection linkage that extends through an opening in the nozzle assembly that communicates with the cylinder.

* * * * *